W. E. WALKER.
PROCESS FOR THE RECOVERY OF GASOLENE AND OTHER HYDROCARBONS.
APPLICATION FILED MAR. 9, 1918.
1,307,280.
Patented June 17, 1919.
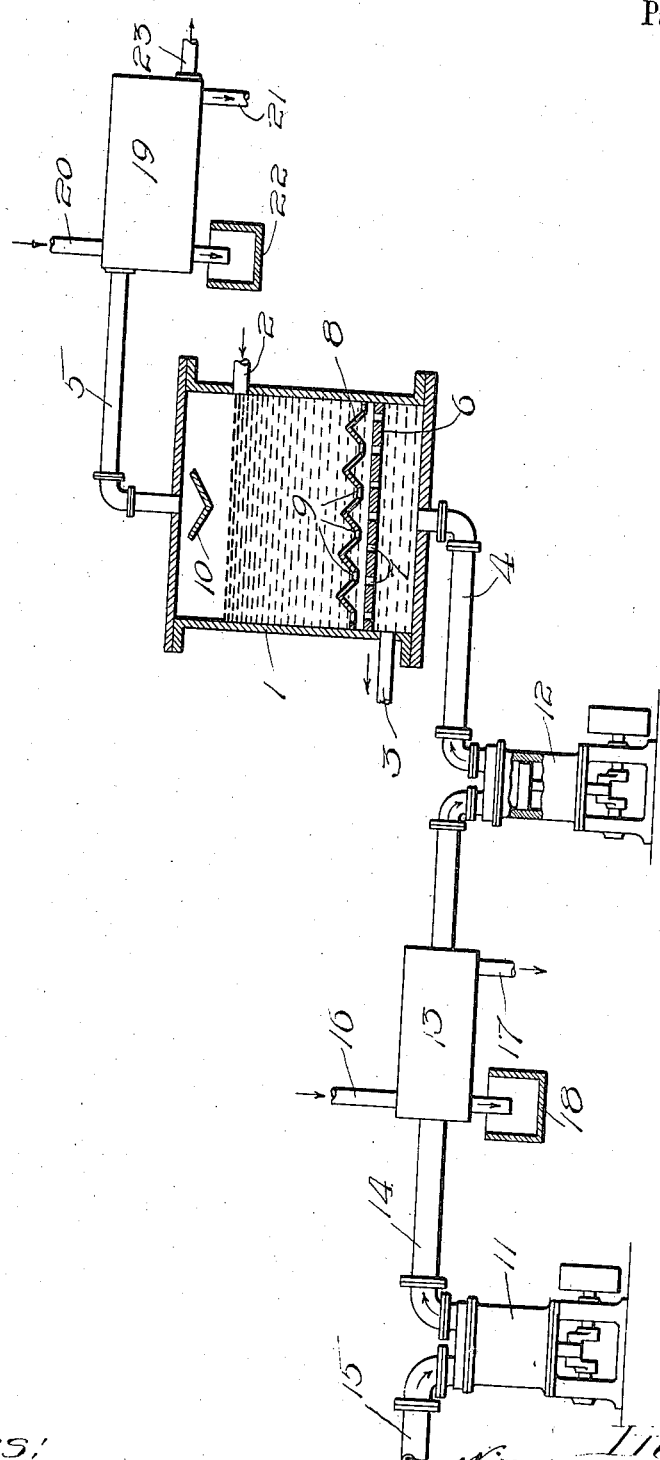

UNITED STATES PATENT OFFICE.

WILLIAM E. WALKER, OF ARKANSAS CITY, KANSAS.

PROCESS FOR THE RECOVERY OF GASOLENE AND OTHER HYDROCARBONS.

1,307,280.  Specification of Letters Patent.  Patented June 17, 1919.

Application filed March 9, 1918. Serial No. 221,391.

*To all whom it may concern:*

Be it known that I, WILLIAM E. WALKER, a citizen of the United States, residing at Arkansas City, in the county of Cowley and State of Kansas, have invented certain new and useful Improvements in Processes for the Recovery of Gasolene and other Hydrocarbons, of which the following is a specification.

The present invention has to do with a new and improved process for recovering gasolene and other hydro-carbons from such complex bodies as natural gas and crude oil. The natural gas comprises a mixture of various hydro-carbons of differing compositions and of greater or less degree of fixidity or permanence, and in different proportions. The mixture or association of these various constitutents is probably chiefly mechanical in nature, although under variations in temperature and pressure certain of the constitutents may change in their chemical composition also. Upon subjecting this mixture of gases to various degrees of pressure and temperature, certain of the constitutents can be precipitated in liquid form, and in this way recovered from the complex mixture.

Different processes are at the present time in use for this partial or fractional recovery of constitutents from the natural gas by the use of pressure and temperature. Since these are well known and understood in the art, I will not particularly explain them in this specification. I will, however, call attention to the fact that where gases are placed under a high pressure such as is used in certain of these processes, their temperature is also raised to a considerable degree, provided the compression be more or less adiabatic in nature, conserving the total amount of heat within the gas to a greater or less extent. Consequently, in the very practice of certain of these processes which are at the present time well known and used, the temperature and pressure of the gas are both raised to a high point.

Crude oil and other liquid hydro-carbons comprise a mixture of various constituents, which mixture is also more or less mechanical in its nature. Possibly different constituents are also in certain chemical combinations, but these would seem also to change with differing degrees of pressure and temperature. It is well understood and known in the art that upon raising the temperature of a body of crude oil, the more volatile or lighter constituents will first evaporate or vaporize, so that they may be recovered independently or separately from the remaining constituents. As the lighter constituents are driven off by the application of heat, the temperature may be raised successively to higher degrees, and the heavier constitutents will be driven off in succession as the temperature of the body is raised from point to point. By the exercise of proper attention and by the use of suitable apparatus, the various constitutents can thus be recovered separately in a greater or less degree of refinement depending largely upon the accuracy with which the "cuts" are made at different temperatures. The practice of this fractional distillation of crude oil and similar complex bodies requires the application of a large amount of work in the form of heat. When this heat is specially generated for this purpose, it follows that a large amount of fuel must be consumed specially for its generation. This means that with the rising cost of fuel the expense attendant upon this phase of the process is becoming greater and a more and more important item.

Where the crude oil is distilled in a considerable body contained within a vat or other similar receptacle to which the heat is applied, great difficulty has in the past been experienced by reason of the fact that the pitch and other heavier hydro-carbons are precipitated on the walls of the container, thereby rapidly reducing the efficiency of heat transfer to the body of oil contained within the vat, besides endangering the lives and limbs of those working in the neighborhood, for the reason that with the reduction of efficiency of heat transfer, there arises danger that the walls of the container will be burned or softened by the fire on the outside to such an extent as to make possible blow-outs and explosions. These have in the past been a serious item in the practice of this process of distillation.

In addition to the foregoing dangers and objections to the use of the bulk or vat process of distillation, this process has been slow and the amount of oil which could be treated in a vat of given size during a given period of time has been relatively small. Consequently the initial investment for a plant of given capacity or output has been very large and conversely the working efficiency has been relatively low.

In the practice of the process to which the present invention relates, I avail myself of the presence of the heat already contained within the gas under high pressure, and which was generated in the process of recovering certain of the constituents from such complex gases as natural gas and the like. That is to say, I combine the treatment of the gas with the treatment of the crude oil or other complex liquid hydrocarbon to the extent that I avail myself of the heat energy already present in the gas under compression for distilling the desired constituents from the complex mass of liquid hydro-carbons. A simple application of the invention consists in the provision of a suitable vat or container for the liquid hydrocarbons, in conjunction with means for causing the gas under pressure and at high temperature to work its way up through the body of the oil, thereby meeting the oil and distilling off the desired constituents and simultaneously mixing or joining the constituents so distilled with the gas which was introduced into the body or mass of the oil. The result will be that the gas delivered after it is passed through the body of the oil will be enriched by those constituents which were distilled out of the body of the oil through which the gas was passed.

Since a reduction of pressure of the gas will be accompanied by a simultaneous reduction in its temperature (assuming that the operation be more or less adiabatic in nature), it follows that, in order to secure the most desirable results, the gas should be substantially up to its initial pressure as it passes through the body of the oil. Thereafter, and when it has taken into its mass or has been enriched by the constituents from the complex liquid, it may be cooled in a suitable container to remove those constituents which will precipitate by the aforesaid reduction in temperature.

If the temperature of the complex body of liquid hydro-carbons be raised to an excessive degree, the process will be accompanied by what is known as "cracking" of certain of the constituents. Consequently, it is desirable to raise the temperature only approximately to 700° F. for the recovery of such lighter hydro-carbons as gasolene, naphtha, etc. In the practice of the process of recovering gasolene, naphtha, etc., from such crude complex mixtures, as natural gas, it is frequently necessary to raise the pressure to 300 pounds per square inch or even higher. With a strictly adiabatic compression of the gas to such pressure, the temperature will generally be considerably higher than that necessary or desirable for the subsequent treatment of the crude oil. Furthermore, it may not be feasible from a practical standpoint to compress the gas at one stage to such a high pressure as 300 pounds per square inch, and, therefore, it is the better practice to carry on the compression in two or more stages. Where the process of my present invention is also made to include the preliminary treatment of the gas for the recovery of certain constituents therefrom, I may insert a condenser between certain of the compression stages for the purpose of therein recovering some of the constituents from the gas. Thereafter the gas will be again compressed in one or more subsequent stages and its temperature raised to that necessary or desirable for the treatment of the liquid hydro-carbons.

It will be understood that, as far as the process of treating the liquid hydro-carbons by the use of gas under high temperature is concerned, said gas might be one or several hydro-carbons mixed together, as, for example, natural gas, or it might be compressed air; or, in some cases, it might be hot gases coming off from a bench of retort coke ovens or the like.

In order that the features of the present process may be more easily understood, I have shown in the drawing in diagrammatic form a simple layout of apparatus for practising the features of the present invention. In this layout, I have shown a vat or tank 1, of sufficiently rigid construction to withstand the pressure under which the process is carried forward. The untreated crude oil is admitted or forced into the tank through the connection 2, and after the process has been completed, the treated oil is delivered through the pipe or connection 3. The gas at high temperature and under proper pressure is delivered into the vat through the pipe 4, and is discharged from the vat through the pipe 5 after it has passed through the body of the oil within the vat.

The process is most effectively practised by causing the hot gas to bubble or force its way up through the mass of liquid oil. For this purpose, I have shown the pipe 4 as leading into the bottom portion of the vat. For a similar reason, I have shown a baffle plate or sheet 6 extending across the lower portion of the vat, and provided with a plurality of openings 7 through which the gas passes in its upward travel so as to distribute it more or less uniformly through the entire body of oil. For a similar reason I have shown another baffle sheet 8 above the plate 6, said baffle sheet 8 having a plurality of hoods directly over the openings 7 and having the intermediate openings 9. Manifestly any other suitable arrangement may be adopted in those cases where special provision is found desirable in order to secure a more or less uniform distribution of the gas through the body of the oil. In order to prevent the entrance of crude oil into the discharge pipe 5 on account of foaming and the like, I have provided a baffle 10 beneath the opening into said discharge pipe.

In many cases the present invention will be practised as a continuous process; that is to say, the untreated oil will be introduced more or less continuously through the pipe 2, the treated oil being similarly removed more or less continuously through the pipe 3. The travel of the gas upwardly through the vat will be more or less across the path of travel of the oil through the vat, so that all portions of the oil will be uniformly treated at all times.

In the particular layout illustrated, I have shown a two stage compressor including the low pressure cylinder 11 and the high pressure cylinder 12. Manifestly, a greater or less number of stages may be used as desired. I have also shown a surface condenser 13 in the pipe 14 which connects the two stages together, the cylinder 11 drawing the gas from the connection 15, compressing it, delivering it through the pipe 14 to the cylinder 12. Cooling water for the condenser 13 may be introduced through the pipe 16 and delivered through the pipe 17, and any gasolene or other constituent precipitated within the condenser 13 will be caught in the vat or trap 18.

After the gas has been again compressed in the cylinder 12 so as to again raise its temperature, it will be delivered through the connection 4 into the vat where the oil is being treated.

In order to recover the gasolene and other constituents from the treated gas, I have shown the discharge or delivery pipe 5 as leading to a surface condenser 19 which is cooled by a stream of water introduced through a connection 20 and discharged through a connection 21. By lowering the temperature of the gas in this condenser, gasolene, naphtha, and other constituents will be brought down which may be caught in the trap 22. The cooled gas, ordinarily still under pressure, will be discharged from this condenser 19 through a connection 23 for further treatment by other processes should that be desirable.

I wish to point out and emphasize the fact that the layout of mechanisms herein illustrated is very well adapted for associating the treatment of the oil with the process for recovery of certain constituents from natural gas by the use of pressure and temperature. For this reason the condenser 13 is illustrated. In some cases a preliminary treatment of the gas for this purpose may be eliminated and the process directed simply to the treatment of the oil within the vat by the use of gas under high temperature. Such a case, for example, would be that in which the oil was being treated by the use of hot air. In this case the air might be under atmospheric pressure, or under some other pressure depending upon the constituents which it was desired to remove from the crude oil.

I wish to point out the fact that the processes and results herein contemplated may also be secured by spraying the oil and gas together, instead of passing the gas through a bath or mass of more or less liquid material containing the enriching hydro-carbons. That is to say, hot gas and more or less liquid material may be intermingled by spraying them together—either one or both being sprayed—or otherwise brought into association at the proper temperature to effect the intermingling desired.

I will also point out that the term "gas" may in many cases include air, or other non-hydro-carbon gas, since many of the features of the present invention may be secured by the use of hot air or other non-hydro-carbon gas, instead of hot more or less gaseous hydro-carbons. For example, if certain of the constituents are to be removed from a complex mixture of more or less liquid hydro-carbons, a current of hot air or other gas (non-hydro-carbon in nature) might be used, or, conversely, a current of air or other non-hydro-carbon gas might be intermingled by spraying with the more or less liquid hydro-carbons, instead of being passed through a liquid mass of the same.

I claim:

1. The process for the treatment of complex hydro-carbons in liquid condition for the recovery of certain desired constituents therefrom, which consists in passing a current of such liquid hydro-carbons through a vat containing a substantial amount thereof in bulk, compressing a current of gaseous hydro-carbons for the purpose of condensing a portion thereof and raising the temperature of the gaseous portion, passing such gaseous portion through the body of liquid hydro-carbons contained in the vat while maintaining its temperature and pressure, to thereby distil a portion of the hydro-carbons from the liquid contained in the vat, and thereafter recovering desired constituents from the resulting gaseous mixture, substantially as described.

2. The process for the treatment of complex hydro-carbons in liquid condition for the recovery of certain desired constituents therefrom, which consists in passing a stream of such hydro-carbons through a vat wherein they are contained in bulk, compressing another complex mixture of gaseous hydrocarbons for the purpose of precipitating a portion thereof and raising the temperature of the compressed but unprecipitated portion, and passing said gas while under compression and at high temperature through the hydro-carbons contained in the vat to thereby distil certain constituents from the material contained in the vat and incorporate the same within the current of gas, substantially as described.

WILLIAM E. WALKER.